(12) United States Patent
Ho et al.

(10) Patent No.: US 8,886,133 B2
(45) Date of Patent: Nov. 11, 2014

(54) NETWORK STATION POWER ADJUSTMENT APPARATUS AND POWER ADJUSTMENT METHOD THEREOF

(75) Inventors: Jan-Shin Ho, Taipei (TW); Wei-Shing Wang, New Taipei (TW)

(73) Assignee: Institute for Information Industry, Taipei (TW)

( * ) Notice: Subject to any disclaimer, the term of this patent is extended or adjusted under 35 U.S.C. 154(b) by 204 days.

(21) Appl. No.: 13/561,832

(22) Filed: Jul. 30, 2012

(65) Prior Publication Data

US 2013/0310094 A1 Nov. 21, 2013

(30) Foreign Application Priority Data

May 15, 2012 (TW) .............................. 101117199 A (51) Int. Cl.
*H04B 1/00* (2006.01)
(52) U.S. Cl.
USPC .......................................... 455/69; 455/501
(58) Field of Classification Search
CPC .. H04W 56/00; H04W 52/0245; H04W 52/04
USPC ........................... 455/69, 522, 13.2, 501, 502
See application file for complete search history.

(56) References Cited

U.S. PATENT DOCUMENTS

2012/0149424 A1* 6/2012 Dawid et al. .................. 455/522

* cited by examiner

*Primary Examiner* — Tu X Nguyen
(74) *Attorney, Agent, or Firm* — Greer, Burns & Crain, Ltd.

(57) ABSTRACT

A network station power adjustment apparatus and a power adjustment method thereof are provided. The network station power adjustment apparatus connects to a base station. The base station connects to a mobile station. The network station power adjustment apparatus determines a synchronization time transformation function according to the connection status between the base station and the mobile station, and further transforms a Signal-Noise ratio between the base station and the mobile station into a synchronization time correspondingly. When the network station power adjustment apparatus determines that the synchronization time is greater than a threshold, the network station power adjustment apparatus transmits a power adjustment signal to the base station so that the base station lowers a base station down-link synchronization channel transmitting power accordingly.

6 Claims, 7 Drawing Sheets

NETWORK STATION POWER ADJUSTMENT APPARATUS AND POWER ADJUSTMENT METHOD THEREOF

This application claims priority to Taiwan Patent Application No. 101117199 filed on May 15, 2012.

CROSS-REFERENCES TO RELATED APPLICATIONS

Not applicable.

BACKGROUND OF THE INVENTION

1. Field of the Invention

The present invention relates to a network station power adjustment apparatus and a power adjustment method thereof. More particularly, the network station power adjustment apparatus and the power adjustment method thereof of the present invention are adapted to optimize a base station down-link synchronization channel transmitting power.

2. Descriptions of the Related Art

In conventional network communication systems, a base station down-link synchronization channel is used for initial synchronization connection between a base station and mobile stations, and the base station down-link synchronization channel transmitting power determines the maximum communication range covered by the base station. Therefore, the base station down-link synchronization channel transmitting power has a direct influence on the quality of synchronization between the base station and the mobile stations.

Specifically, to speak in an intuitive way, a high base station down-link synchronization channel transmitting power means that the initial synchronization connection can be accomplished by the base station within a wide communication range. In other words, if the base station down-link synchronization channel transmitting power is adjusted to be high, then a high synchronization connection quality will be obtained between the base station and the mobile stations. The conventional practice is to set a ratio of the base station down-link synchronization channel transmitting power to the maximum transmitting power of the base station as a fixed value according to practical experiences.

However, if the base station down-link synchronization channel transmitting power is adjusted to be overhigh, then the maximum transmitting power of the base station will be indirectly reduced to cause a limitation on the data transmission bandwidth between the base station and the mobile stations and, moreover, the interferences between down-link synchronization channels of different base stations will be increased. On the other hand, if the base station down-link synchronization channel transmitting power is adjusted to be too low, then the communication range in which the base station can accomplish the initial synchronization connection will be narrowed.

Furthermore, when pseudo noise codes are used for synchronization between the base station and the mobile stations in a conventional Wideband Code Division Multiple Access (WCDMA) network system, the network system mainly utilizes a 3-stage cell search to accomplish the synchronization. Therefore, in case that the frequency errors of oscillators of the mobile stations and the base station down-link synchronization channel transmitting power are both high, then mobile stations having a high signal-to-noise ratio (i.e., closer to the base station) will unexpectedly have a longer synchronization time instead.

Accordingly, an urgent need exists in the art to provide a solution that can dynamically adjust transmitting powers of different channels of stations in a network system according to the network environment so that the aforesaid shortcomings of the prior art can be solved.

SUMMARY

To solve the aforesaid problems, the present invention provides a network station power adjustment apparatus and a power adjustment method thereof, which transform a signal-to-noise ratio into a synchronization time via a synchronization time transformation function based on a frequency error of a mobile station. Thereby, it can be determined whether the synchronization time corresponding to a high signal-to-noise ratio unexpectedly becomes longer so as to adjust the base station down-link synchronization channel transmitting power correspondingly.

To achieve the aforesaid objective, the present invention provides a power adjustment method for use in a network station power adjustment apparatus. The network station power adjustment apparatus is used in a network system. The network system comprises a base station and a first mobile station. The network station power adjustment apparatus connects with the base station, and the base station connects with the first mobile station. The power adjustment method comprises the following steps: (a) enabling the network station power adjustment apparatus to decide a synchronization time transformation function according to a connection status between the base station and the first mobile station; (b) enabling the network station power adjustment apparatus to transform at least one signal-to-noise ratio between the base station and the first mobile station into at least one first synchronization time via the synchronization time transformation function based on a frequency error of the first mobile station while the base station transmits signals at a base station down-link synchronization channel transmitting power, wherein the at least one signal-to-noise ratio is greater than a signal-to-noise ratio threshold; (c) enabling the network station power adjustment apparatus to determine that the at least one first synchronization time is greater than a synchronization time threshold; and (d) enabling the network station power adjustment apparatus to transmit a first power adjustment message to the base station based on the result of step (c) so that the base station decreases the base station down-link synchronization channel transmitting power according to the first power adjustment message.

To achieve the aforesaid objective, the present invention further provides a network station power adjustment apparatus for use in a network system. The network system comprises a base station and a first mobile station. The network station power adjustment apparatus connects with the base station. The base station connects with the first mobile station. The network station power adjustment apparatus comprises a memory, a transceiver and a processing unit. The memory stores a signal-to-noise ratio threshold and a synchronization time threshold. The processing unit decides a synchronization time transformation function according to a connection status between the base station and the first mobile station and transforms at least one signal-to-noise ratio between the base station and the first mobile station into at least one first synchronization time via the synchronization time transformation function based on a frequency error of the first mobile station while the base station transmits signals at a base station down-link synchronization channel transmitting power, and the at least one signal-to-noise ratio is greater than the signal-to-noise ratio threshold. The processing unit further determines that the at least one first synchronization time is greater than the synchronization time threshold. The transceiver transmits a first power adjustment message to the base station based on the result that the at least one first synchronization time is greater than the synchronization time threshold so that the base station decreases the base station downlink synchronization channel transmitting power according to the first power adjustment message.

With the technical features disclosed above, the network station power adjustment apparatus and the power adjustment method thereof according to the present invention can transform a high signal-to-noise ratio into a synchronization time based on a frequency error of a mobile station. Thereby, it can be determined whether the synchronization time corresponding to the high signal-to-noise ratio unexpectedly becomes longer so as to adjust the base station down-link synchronization channel transmitting power correspondingly.

DETAILED DESCRIPTION

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1A:
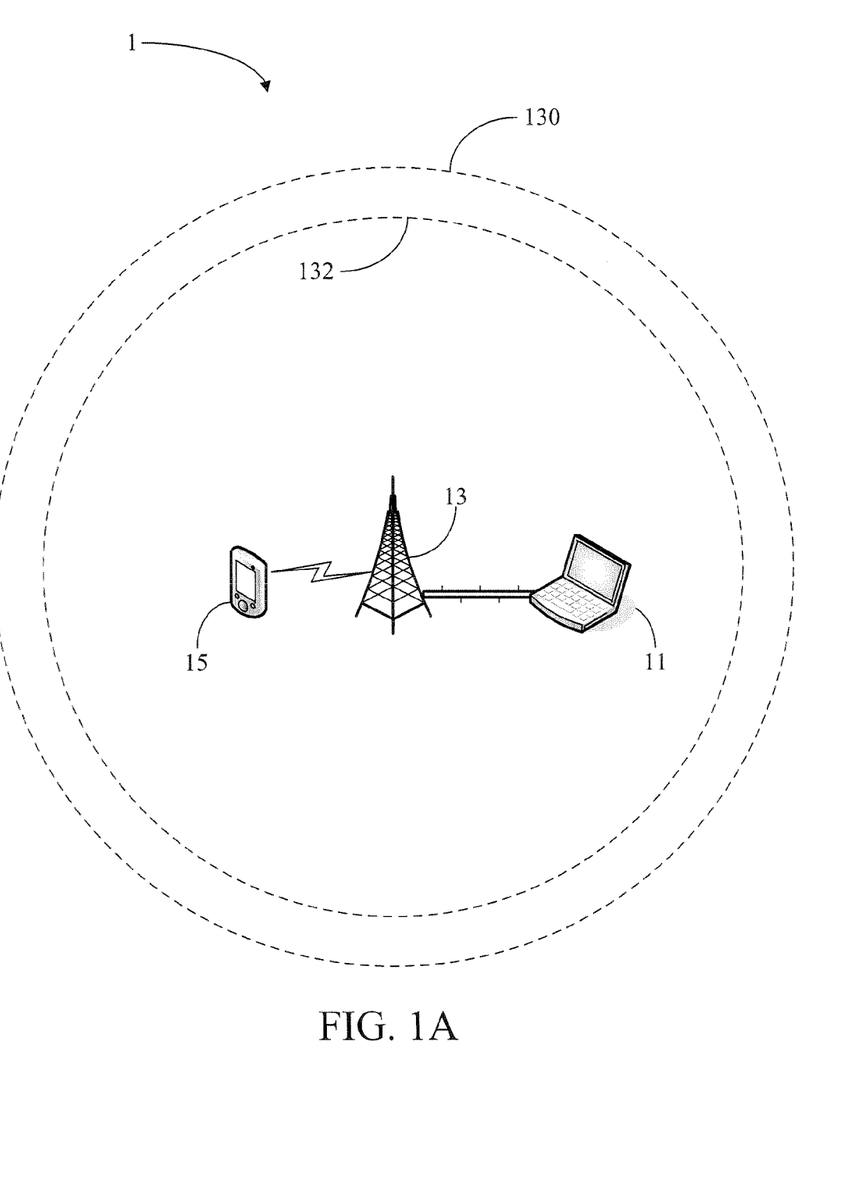
FIG. 1A is a schematic view of a network system according to a first embodiment of the present invention.
Figure 1B:
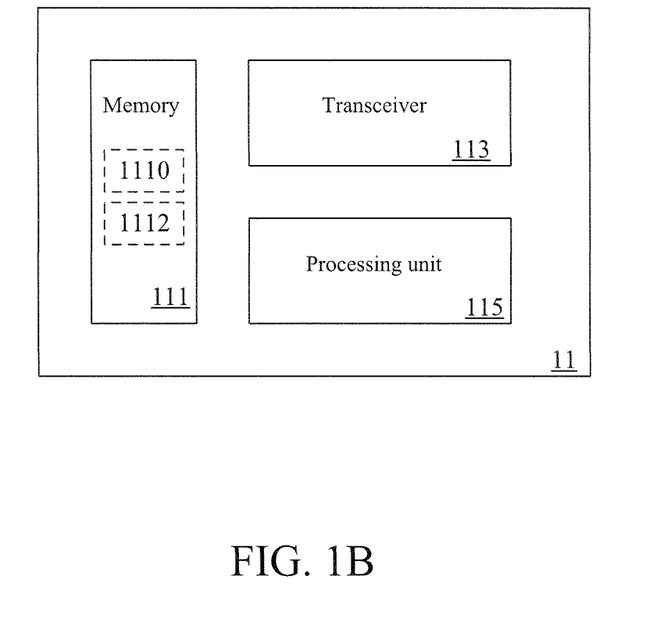
FIG. 1B is a schematic view of a network station power adjustment apparatus according to the first embodiment of the present invention.

Please refer to FIG. 1A and FIG. 1B together. FIG. 1A is a schematic view of a network system 1 according to a first embodiment of the present invention. The network system 1 comprises a network station power adjustment apparatus 11, a base station 13 and a first mobile station 15. FIG. 1B is a schematic view of the network station power adjustment apparatus 11 according to the first embodiment of the present invention. The network station power adjustment apparatus 11 comprises a memory 111, a transceiver 113 and a processing unit 115. The memory 111 stores a signal-to-noise ratio threshold 1110 and a synchronization time threshold 1112. In the first embodiment, the network station power adjustment apparatus 11 connects with the base station 13 via a common Ethernet, and the base station 13 connects with the first mobile station 15 via a Wideband Code Division Multiple Access (WCDMA) network. It shall be particularly noted that the ways in which the network connections are accomplished are just shown for illustration purpose but are not to limit implementations of the present invention. Interactions between the network components will be further described hereinafter.

Firstly, the network station power adjustment apparatus 11 decides a synchronization time transformation function H between the base station 13 and the first mobile station 15, which is mainly used to transform a signal-to-noise ratio between the base station 13 and the first mobile station 15 into a synchronization time. Specifically, because there is a network connection between the base station 13 and the first mobile station 15, the transceiver 113 of the network station power adjustment apparatus 11 may firstly receive from the base station 13 a connection status between the base station 13 and the first mobile station 15. Then, the processing unit 115 of the network station power adjustment apparatus 11 decides the synchronization time transformation function H between the base station 13 and the first mobile station 15 according to the connection status between the base station 13 and the first mobile station 15. The synchronization time transformation function H is used to transform the signal-to-noise ratio between the base station 13 and the first mobile station 15 into a synchronization time corresponding to the base station 13 and the first mobile station 15 based on parameters related to the network connection between the base station 13 and the first mobile station 15, and the synchronization time will be used in a subsequent determination step.

Further speaking, pseudo noise codes are used for synchronization between the base station 13 and the mobile station 15 in the Wideband Code Division Multiple Access (WCDMA) network system. Therefore, in case the oscillator of the first mobile station 15 has a large frequency error, then the closer the first mobile station 15 is to base station 13, the longer the synchronization time for the base station 13 and the first mobile station 15 will become. Accordingly, in the first embodiment, assuming that the first mobile station 15 has a large frequency error and the at least one signal-to-noise ratio between the first mobile station 15 and the base station 13 is greater than the signal-to-noise ratio threshold 1110 (which means that the first mobile station 15 is located in a geographic range where the signal-to-noise ratio between the first mobile station 15 and the base station 13 is greater than the signal-to-noise ratio threshold 1110), then the processing unit 115 of the network station power adjustment apparatus 11 transforms the at least one signal-to-noise ratio between the base station 13 and the first mobile station 15 into at least one first synchronization time via the synchronization time transformation function H based on the large frequency error of the first mobile station 15 while the base station 13 transmits signals at a base station down-link synchronization channel transmitting power (i.e., corresponding to a communication range 130).

After the processing unit 115 determines that the at least one first synchronization time is greater than the synchronization time threshold 1112, the transceiver 113 of the network station power adjustment apparatus 11 transmits a first power adjustment message 1130 to the base station 13 so that the base station 13 decreases the base station down-link synchronization channel transmitting power (i.e., corresponding to a communication range 132) according to the first power adjustment message 1130.

More specifically, the synchronization time for the first mobile station 15 and the base station 13 usually has to be set within a fixed time value range in order to satisfy the quality of service (QoS) required between the mobile station and the base station. In this case, the synchronization time threshold 1112 may be used as an upper limit of the synchronization time. Thus, once the network station power adjustment apparatus 11 detects that the synchronization time for the base station 13 and the first mobile station 15 increases unexpectedly due to a too close distance therebetween (i.e., the signal-to-noise ratio between the base station 13 and the first mobile station 15 is greater than the signal-to-noise ratio threshold 1110), the network station power adjustment apparatus 11 can notify the base station 13 to decrease the base station down-link synchronization channel transmitting power so as to shorten the synchronization time that increases unexpectedly due to the too close distance therebetween.

Additionally, the synchronization time transformation function H is calculated according to the network connection status between the base station and the first mobile station, and specifically, mainly according to a synchronization success status between the base station and the first mobile station. In detail, the processing unit 115 of the network station power adjustment apparatus 11 decides a synchronization failure probability function P1, a synchronization success probability function P2 and a re-synchronization probability function P3 between the base station 13 and the first mobile station 15 according to the connection status between the base station 13 and the first mobile station 15.

The synchronization failure probability function P1 represents a failure probability of synchronization between the base station 13 and the first mobile station 15, the synchronization success probability function P2 represents a success probability of synchronization between the base station 13 and the first mobile station 15, and the re-synchronization probability function P3 represents a probability that the synchronization is found to fail according to data resolving errors after the base station 13 and the first mobile station 15 have been connected in synchronism for a while.

Accordingly, the synchronization failure probability function P1, the synchronization success probability function P2 and the re-synchronization probability function P3 are all important factors that can affect the synchronization time. Therefore, after having decided the synchronization failure probability function P1, the synchronization success probability function P2 and the re-synchronization probability function P3, the processing unit 115 of the network station power adjustment apparatus 11 may further adjust the synchronization failure probability function P1, the synchronization success probability function P2 and the re-synchronization probability function P3 into the synchronization time transformation function H via Mason's Rule so that the synchronization time transformation function H can be used to transform the network environment parameter ratio into the synchronization time. It shall be particularly noted that, adjusting the probability functions into a specific transformation function via Mason's Rule is just a conventional technology and will not be further described herein.

In the way described in the first embodiment, the synchronization time that increases unexpectedly due to a too close distance can be shortened by decreasing the base station down-link synchronization channel transmitting power. On the other hand, a decrease in the base station down-link synchronization channel transmitting power also means a corresponding decrease in the communication range that can be covered by the base station. In this case, the problem that the communication range covered by the base station is reduced to cause a prolonged synchronization time of the mobile station can be solved by adjusting the signal transmitting power of a relay station.

Figure 2A:
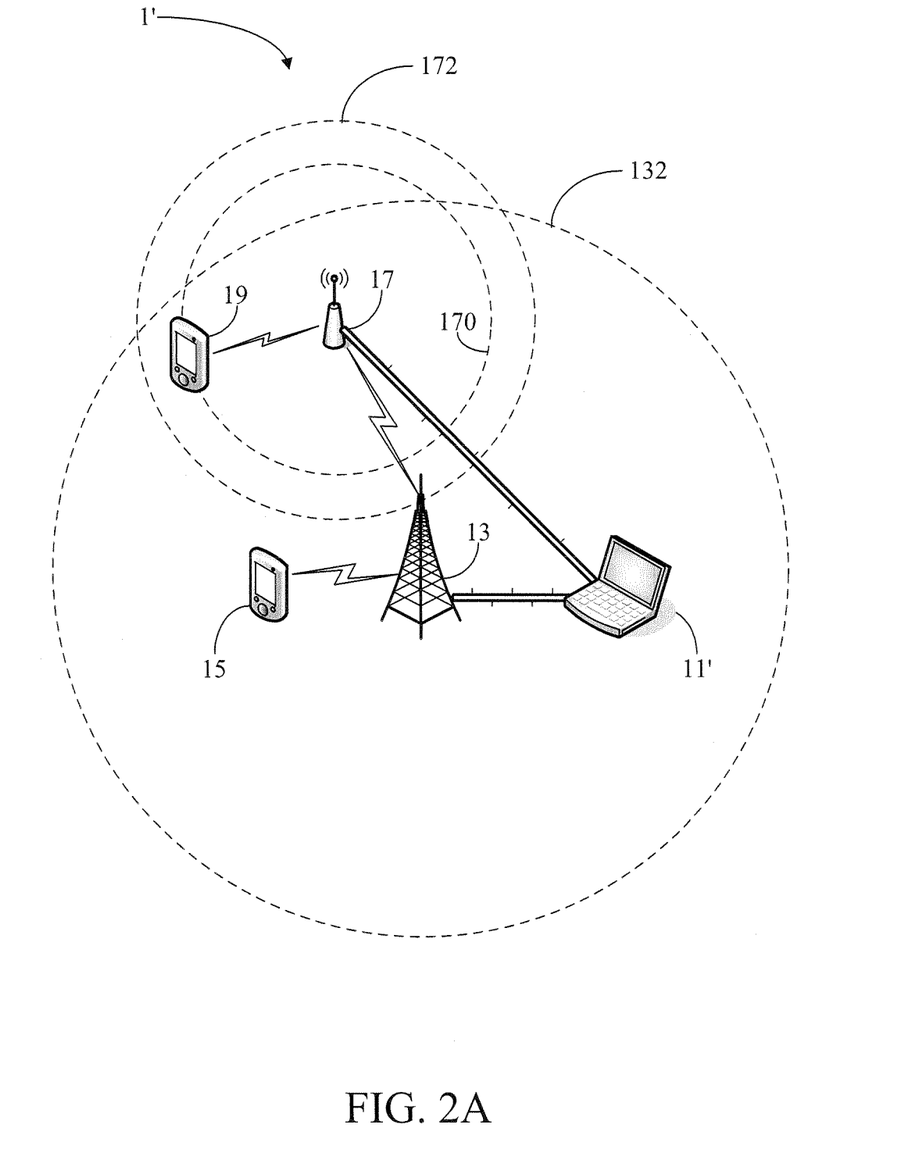
FIG. 2A is a schematic view of a network system according to a second embodiment of the present invention.
Figure 2B:
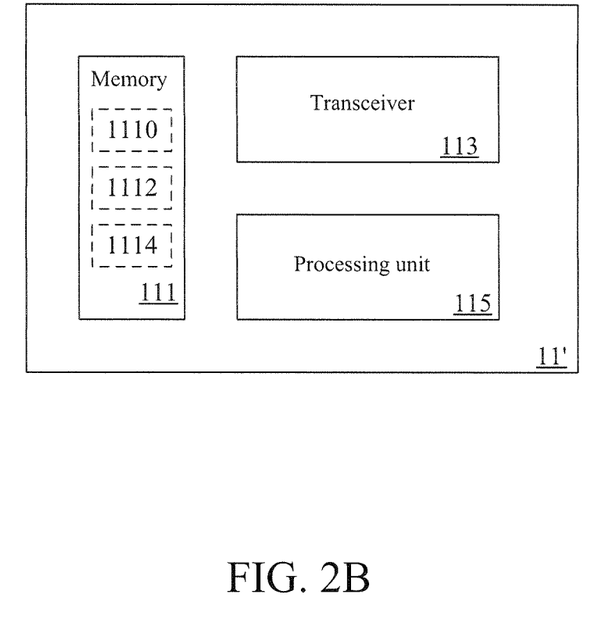
FIG. 2B is a schematic view of a network station power adjustment apparatus according to the second embodiment of the present invention.

Please refer to FIG. 2A and FIG. 2B. FIG. 2A is a schematic view of a network system 1' according to a second embodiment of the present invention, and FIG. 2B is a schematic view of a network station power adjustment apparatus 11' according to the second embodiment of the present invention. It shall be particularly noted that, the hardware structure and the network connection environment of the second embodiment are similar to those of the first embodiment, so components bearing the same reference numerals have the same functions and will not be further described herein. The second embodiment differs from the first embodiment in that, the network system 1' further comprises a relay station 17 and a second mobile station 19, the network station power adjustment apparatus 11' further connects with the relay station 17, and the second mobile station 19 connects with the base station 13 via the relay station 17.

Specifically, the network station power adjustment apparatus 11' calculates a power ratio according to a relay station down-link synchronization channel transmitting power (i.e., corresponding to the communication range 170) of the relay station 17 and the base station down-link synchronization channel transmitting power (i.e., a ratio of the relay station down-link synchronization channel transmitting power to the base station down-link synchronization channel transmitting power). It shall be particularly noted that, a higher power ratio means that the signal receiving site is closer to a location where a communication range of the relay station overlaps with a communication range of the base station to a greater extent; and conversely, a lower power ratio means that the signal receiving site is closer to a location where a communication range of the relay station overlaps with a communication range of the base station to a less extent.

Because the mobile station can also connect with the base station directly at the location where a communication range of the relay station overlaps with a communication range of the base station to a greater extent, the case where the synchronization time of the mobile station connecting with the base station via the relay station is too long at such a location will not be considered. In the second embodiment, only the case where the relay station down-link synchronization channel transmitting power is smaller than the transmitting power threshold 1114 (i.e., the power ratio is smaller than a specific threshold) will be considered.

Similarly, the network station power adjustment apparatus 11' further transforms the power ratio into a second synchronization time, which is necessary for synchronization between the second mobile station 19 and the base station 13 through the relay station 17, via the synchronization time transformation function H based on a frequency error of the second mobile station 19. In order to ensure consistency of the power adjustment measurement results, the frequency error of the second mobile station 19 is equal to the frequency error of the first mobile station 15.

Next, when the network station power adjustment apparatus 11' determines that the second synchronization time is greater than the synchronization time threshold 1114, the transceiver 113 of the network station power adjustment apparatus 11' transmits a second power adjustment message to the relay station 17 so that the relay station 17 increases the relay station down-link synchronization channel transmitting power (i.e., corresponding to the communication range 172) according to the second power adjustment message. In this way, the second synchronization time for the second mobile station 19 and the base station 13 can be shortened.

In other words, the problem that the base station down-link synchronization channel transmitting power is reduced to cause a prolonged synchronization time of the mobile station can be solved by adjusting the relay station down-link synchronization channel transmitting power.

Figure 3:
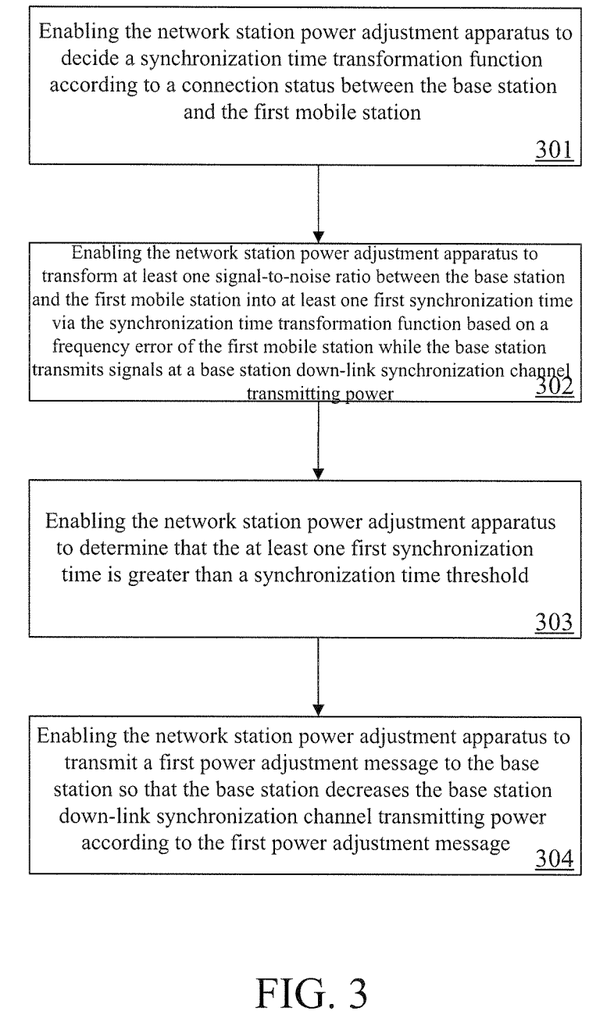
FIG. 3 is a flowchart diagram of a power adjustment method according to a third embodiment of the present invention.

Referring to FIG. 3, there is shown a flowchart diagram of a power adjustment method according to a third embodiment of the present invention. The power adjustment method of the third embodiment is for use in a network station power adjustment apparatus (e.g., the network station power adjustment apparatus of the first embodiment). The network station power adjustment apparatus is used in a network system, which comprises a base station and a first mobile station. The network station power adjustment apparatus connects with the base station, and the base station connects with the first mobile station. Steps of the power adjustment method of the third embodiment will be detailed as follows.

Firstly, step 301 is executed to enable the network station power adjustment apparatus to decide a synchronization time transformation function according to a connection status between the base station and the first mobile station. The synchronization time transformation function is used to transform the signal-to-noise ratio between the base station and the first mobile station into a synchronization time corresponding to the base station and the first mobile station based on parameters related to the network connection between the base station and the first mobile station, and the synchronization time will be used in a subsequent determination step.

Next, step 302 is executed to enable the network station power adjustment apparatus to transform at least one signal-to-noise ratio between the base station and the first mobile station into at least one first synchronization time via the synchronization time transformation function based on a frequency error of the first mobile station while the base station transmits signals at a base station down-link synchronization channel transmitting power, wherein the at least one signal-to-noise ratio is greater than a signal-to-noise threshold.

Next, step 303 is executed to enable the network station power adjustment apparatus to determine that the at least one first synchronization time is greater than a synchronization time threshold. Finally, step 304 is executed to enable the network station power adjustment apparatus to transmit a first power adjustment message to the base station based on the result of step 303 so that the base station decreases the base station down-link synchronization channel transmitting power according to the first power adjustment message.

As can be known from the above descriptions, once the network station power adjustment apparatus detects that the synchronization time for the base station and the first mobile station increases unexpectedly due to a too close distance therebetween (i.e., the signal-to-noise ratio between the base station and the first mobile station is greater than the signal-to-noise ratio threshold), the network station power adjustment apparatus can notify the base station to decrease the base station down-link synchronization channel transmitting power so as to shorten the synchronization time that increases unexpectedly due to the too close distance therebetween.

It shall be particularly noted that, the synchronization time transformation function is calculated according to the network connection status between the base station and the first mobile station, and specifically, mainly according to a synchronization success status between the base station and the first mobile station. Correspondingly, the step 301 may be subdivided into two steps in other implementations. Firstly, the network station power adjustment apparatus decides a synchronization failure probability function, a synchronization success probability function and a re-synchronization probability function between the base station and the first mobile station according to the connection status between the base station and the first mobile station.

The synchronization failure probability function represents a failure probability of synchronization between the base station and the first mobile station, the synchronization success probability function represents a success probability of synchronization between the base station and the first mobile station, and the re-synchronization probability function represents a probability that the synchronization is found to fail according to data resolving errors after the base station and the first mobile station have been connected in synchronism for a while.

Accordingly, the synchronization failure probability function, the synchronization success probability function and the re-synchronization probability function are all important factors that can affect the synchronization time. Therefore, after having decided the synchronization failure probability function, the synchronization success probability function and the re-synchronization probability function, the network station power adjustment apparatus further adjusts the synchronization failure probability function, the synchronization success probability function and the re-synchronization probability function into the synchronization time transformation function via Mason's Rule so that the synchronization time transformation function can be used to transform the network environment parameter ratio into the synchronization time.

Figure 4A:
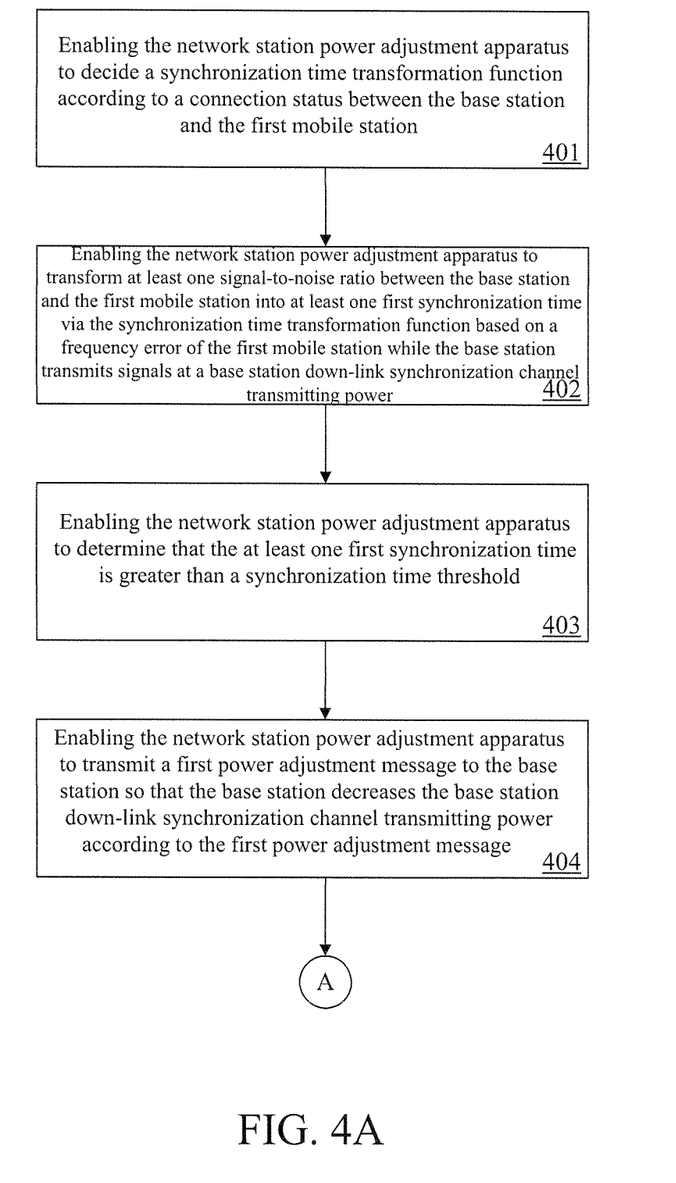
FIGS. 4A-4B are flowchart diagrams of a power adjustment method according to a fourth embodiment of the present invention.
Figure 4B:
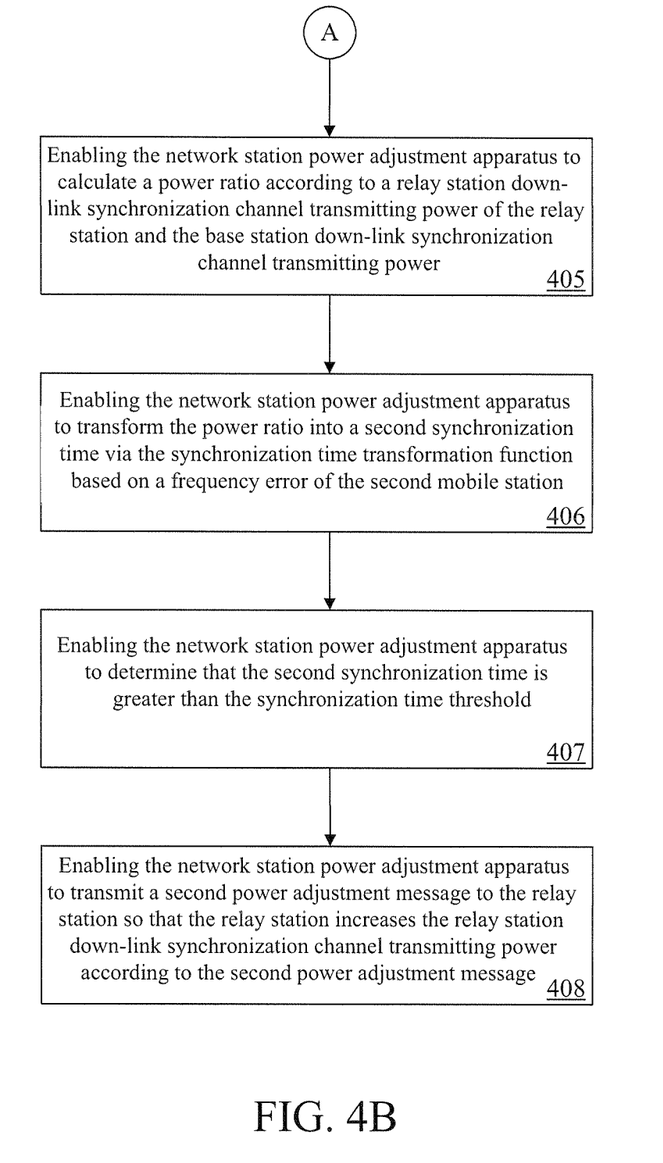

Referring to FIG. 4A and FIG. 4B, there are shown flowchart diagrams of a power adjustment method according to a fourth embodiment of the present invention. The method of the fourth embodiment is also for use in a network station power adjustment apparatus (e.g., the network station power adjustment apparatus of the second embodiment). The network station power adjustment apparatus is used in a network system, which comprises a base station, a first mobile station, a relay station and a second mobile station. The network station power adjustment apparatus connects with the base station and the relay station, the base station connects with the first mobile station, and the second mobile station connects with the base station via the relay station. Steps of the power adjustment method of the fourth embodiment will be detailed as follows.

Firstly, step 401 is executed to enable the network station power adjustment apparatus to decide a synchronization time transformation function according to a connection status between the base station and the first mobile station. The synchronization time transformation function is used to transform a signal-to-noise ratio between the base station and the first mobile station into a synchronization time corresponding to the base station and the first mobile station based on parameters related to the network connection between the base station and the first mobile station, and the synchronization time will be used in a subsequent determination step.

Next, step 402 is executed to enable the network station power adjustment apparatus to transform at least one signal-to-noise ratio between the base station and the first mobile station into at least one first synchronization time via the synchronization time transformation function based on a frequency error of the first mobile station while the base station transmits signals at a base station down-link synchronization channel transmitting power, wherein the at least one signal-to-noise ratio is greater than a signal-to-noise threshold.

Next, step 403 is executed to enable the network station power adjustment apparatus to determine that the at least one first synchronization time is greater than a synchronization time threshold. Step 404 is executed to enable the network station power adjustment apparatus to transmit a first power adjustment message to the base station based on the result of step 403 so that the base station decreases the base station down-link synchronization channel transmitting power according to the first power adjustment message. Thereby, the synchronization time that increases unexpectedly due to a too close distance is shortened. However, because a decrease in the base station down-link synchronization channel transmitting power also means that the communication range covered by the base station is reduced correspondingly, the signal transmitting power of the relay station may be adjusted to solve the problem that the communication range covered by the base station is reduced to cause a prolonged synchronization time of the mobile station.

Step 405 is then executed to enable the network station power adjustment apparatus to calculate a power ratio according to a relay station down-link synchronization channel transmitting power of the relay station and the base station down-link synchronization channel transmitting power. The relay station down-link synchronization channel transmitting power is smaller than a transmitting power threshold.

Step 406 is executed to enable the network station power adjustment apparatus to transform the power ratio into a second synchronization time via the synchronization time transformation function based on a frequency error of the second mobile station. The frequency error of the second mobile station is equal to the frequency error of the first mobile station. Step 407 is executed to enable the network station power adjustment apparatus to determine that the second synchronization time is greater than the synchronization time threshold. Finally, step 408 is executed to enable the network station power adjustment apparatus to transmit a second power adjustment message to the relay station according to the result of step 407 so that the relay station increases the relay station down-link synchronization channel transmitting power according to the second power adjustment message.

In this way, the second synchronization time for the second mobile station and the base station can be shortened. In other words, the problem that the base station down-link synchronization channel transmitting power is decreased to cause a prolonged synchronization time of the mobile station can be solved by adjusting the relay station down-link synchronization channel transmitting power.

According to the above descriptions, the network station power adjustment apparatus and the power adjustment method thereof according to the present invention can transform a high signal-to-noise ratio into a synchronization time based on a frequency error of a mobile station. Thereby, it can be determined whether the synchronization time corresponding to the high signal-to-noise ratio unexpectedly becomes longer so as to adjust the base station down-link synchronization channel transmitting power correspondingly.

Furthermore, the network station power adjustment apparatus and the power adjustment method thereof according to the present invention can also adjust the relay station down-link synchronization channel transmitting power after the base station down-link synchronization channel transmitting power has been adjusted; and in this way, the problem that the communication range covered by the base station is reduced to cause a prolonged synchronization time of the mobile station can be effectively solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A power adjustment method for use in a network station power adjustment apparatus, the network station power adjustment apparatus being used in a network system, the network system comprising a base station and a first mobile station, the network station power adjustment apparatus connecting with the base station, the base station connecting with the first mobile station, and the power adjustment method comprising the following steps:
   (a) enabling the network station power adjustment apparatus to decide a synchronization time transformation function according to a connection status between the base station and the first mobile station;
   (b) enabling the network station power adjustment apparatus to transform at least one signal-to-noise ratio between the base station and the first mobile station into at least one first synchronization time via the synchronization time transformation function based on a frequency error of the first mobile station while the base station transmits signals at a base station down-link synchronization channel transmitting power, wherein the at least one signal-to-noise ratio is greater than a signal-to-noise ratio threshold;
   (c) enabling the network station power adjustment apparatus to determine that the at least one first synchronization time is greater than a synchronization time threshold; and
   (d) enabling the network station power adjustment apparatus to transmit a first power adjustment message to the base station based on the result of step (c) so that the base station decreases the base station down-link synchronization channel transmitting power according to the first power adjustment message.

2. The power adjustment method as claimed in claim 1, wherein the network system further comprises a relay station and a second mobile station, the network station power adjustment apparatus further connects with the relay station, the second mobile station connects with the base station via the relay station, and the power adjustment method further comprises the following steps:
   (e) enabling the network station power adjustment apparatus to calculate a power ratio according to a relay station down-link synchronization channel transmitting power of the relay station and the base station down-link synchronization channel transmitting power, wherein the relay station down-link synchronization channel transmitting power is smaller than a transmitting power threshold;
   (f) enabling the network station power adjustment apparatus to transform the power ratio into a second synchronization time via the synchronization time transformation function based on a frequency error of the second mobile station, wherein the frequency error of the second mobile station is equal to the frequency error of the first mobile station;
   (g) enabling the network station power adjustment apparatus to determine that the second synchronization time is greater than the synchronization time threshold; and
   (h) enabling the network station power adjustment apparatus to transmit a second power adjustment message to the relay station according to the result of step (g) so that the relay station increases the relay station down-link synchronization channel transmitting power according to the second power adjustment message.

3. The power adjustment method as claimed in claim 1, wherein step (a) further comprises:
   (a1) enabling the network station power adjustment apparatus to decide a synchronization failure probability function, a synchronization success probability function and a re-synchronization probability function between the base station and the first mobile station according to a connection status between the base station and the first mobile station; and (a2) enabling the network station power adjustment apparatus to adjust the synchronization failure probability function, the synchronization success probability function and the re-synchronization probability function into the synchronization time transformation function via Mason's Rule.

4. A network station power adjustment apparatus for use in a network system, the network system comprising a base station and a first mobile station, the network station power adjustment apparatus connecting with the base station, the base station connecting with the first mobile station, the network station power adjustment apparatus comprising:

a memory, storing a signal-to-noise ratio threshold and a synchronization time threshold;

a transceiver; and a processing unit;

wherein the processing unit decides a synchronization time transformation function according to a connection status between the base station and the first mobile station and transforms at least one signal-to-noise ratio between the base station and the first mobile station into at least one first synchronization time via the synchronization time transformation function based on a frequency error of the first mobile station while the base station transmits signals at a base station down-link synchronization channel transmitting power, the at least one signal-to-noise ratio is greater than the signal-to-noise ratio threshold, the processing unit further determines that the at least one first synchronization time is greater than the synchronization time threshold, and the transceiver transmits a first power adjustment message to the base station based on the result that the at least one first synchronization time is greater than the synchronization time threshold so that the base station decreases the base station down-link synchronization channel transmitting power according to the first power adjustment message.

5. The network station power adjustment apparatus as claimed in claim 4, wherein the network system further comprises a relay station and a second mobile station, the network station power adjustment apparatus further connects with the relay station, the second mobile station connects with the base station via the relay station, the memory further stores a transmitting power threshold, the processing unit further calculates a power ratio according to a relay station down-link synchronization channel transmitting power of the relay station and the base station down-link synchronization channel transmitting power, the relay station down-link synchronization channel transmitting power is smaller than the transmitting power threshold, the processing unit further transforms the power ratio into a second synchronization time via the synchronization time transformation function based on a frequency error of the second mobile station, the frequency error of the second mobile station is equal to the frequency error of the first mobile station, the processing unit further determines that the second synchronization time is greater than the synchronization time threshold, and the transceiver further transmits a second power adjustment message to the relay station according to the result that the second synchronization time is greater than the synchronization time threshold so that the relay station increases the relay station down-link synchronization channel transmitting power according to the second power adjustment message.

6. The network station power adjustment apparatus as claimed in claim 4, wherein the processing unit further decides a synchronization failure probability function, a synchronization success probability function and a re-synchronization probability function between the base station and the first mobile station according to a connection status between the base station and the first mobile station, and adjusts the synchronization failure probability function, the synchronization success probability function and the re-synchronization probability function into the synchronization time transformation function via Mason's Rule.

\* \* \* \* \*